United States Patent
Alkire et al.

(10) Patent No.: US 6,356,082 B1
(45) Date of Patent: Mar. 12, 2002

(54) UTILITY LOCATOR RADIO LINK

(75) Inventors: William Alkire, Ashburn, VA (US); Guillermo Warley, Frederick, MD (US)

(73) Assignee: Schonstedt Instruments Co., Kearneysville, WV (US)

(*) Notice: Subject to any disclaimer, the term of this patent is extended or adjusted under 35 U.S.C. 154(b) by 0 days.

(21) Appl. No.: 09/579,711

(22) Filed: May 26, 2000

(51) Int. Cl.[7] .......................... G01V 3/11; G01V 3/165; H04B 7/00
(52) U.S. Cl. .............................. 324/326; 324/67; 455/69
(58) Field of Search ........................ 324/326, 334–337, 324/528–530, 67; 455/69

(56) References Cited

U.S. PATENT DOCUMENTS

| | | | |
|---|---|---|---|
| 4,091,322 A | | 5/1978 | Stankoff |
| 4,370,610 A | * | 1/1983 | Allen et al. .................. 324/529 |
| 4,387,340 A | | 6/1983 | Peterman |
| 4,520,317 A | | 5/1985 | Peterman |
| 4,639,674 A | | 1/1987 | Rippingale |
| 4,672,321 A | * | 6/1987 | Howell ........................ 324/326 |
| 4,818,944 A | | 4/1989 | Rippingale |
| 5,001,430 A | | 3/1991 | Peterman et al. |
| 5,043,666 A | | 8/1991 | Tavernetti et al. |
| 5,093,622 A | | 3/1992 | Balkman |
| 5,194,812 A | | 3/1993 | Yokoi |
| 5,264,795 A | | 11/1993 | Rider |
| 5,361,029 A | * | 11/1994 | Rider et al. .................. 324/326 |
| 5,430,379 A | | 7/1995 | Parkinson et al. |
| 5,469,155 A | | 11/1995 | Archambeault et al. |
| 5,570,010 A | | 10/1996 | Jin et al. |
| 5,644,237 A | | 7/1997 | Eslambolchi et al. |
| 5,686,828 A | | 11/1997 | Peterman et al. |
| 5,698,981 A | | 12/1997 | Mercer |
| 5,798,644 A | | 8/1998 | Eslambolchi et al. |
| 5,914,602 A | | 6/1999 | Mercer |
| 5,963,042 A | * | 10/1999 | Suyama et al. ......... 324/326 X |

* cited by examiner

*Primary Examiner*—Gerard R. Strecker
(74) *Attorney, Agent, or Firm*—Lawrence R. Franklin

(57) ABSTRACT

A radio link is established between the portable receiver used by an operator to trace the underground portion of a utility and the transmitter which induces a magnetic signal in the utility. Circuitry in both transmitter and receiver allows the operator who is remote from the transmitter to interrogate the transmitter from the receiver for essential information and to control operating functions at the transmitter. Such operations as changing the transmission frequency of the generator, conserving batter power by switching the transmitter's frequency generator to and from a power saving standby mode during periods of non-use, checking on the power level of the battery, and determining if the transmission circuit is complete and unbroken can be effected without the necessity of the operator returning to the site of the transmitter.

19 Claims, 9 Drawing Sheets

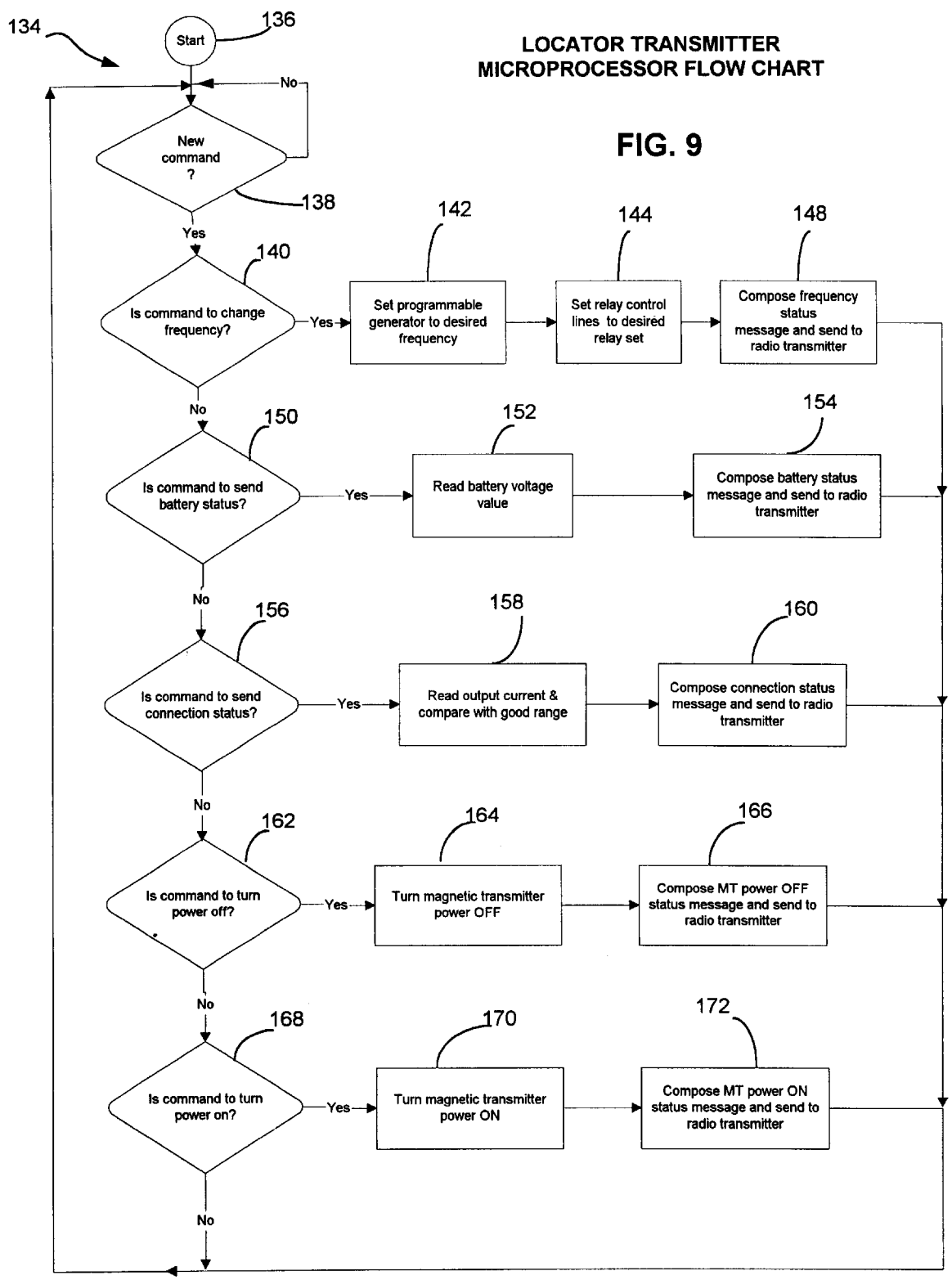

UTILITY LOCATOR RADIO LINK

BACKGROUND OF THE INVENTION

1. Field of the Invention

This invention relates to instruments for locating and following underground pipes, cables, and other underground entities which have electrical continuity, whether inherent naturally therein or intentionally associated therewith.

2. Description of Related Art

It is well known to locate underground utilities, such as electrical cables, water mains, and gas pipes, by imposing an electromagnetic signal thereon and detecting the magnetic field generated by the current flow therethrough. Non-conductive underground utilities, such as fiber optic cables, are commonly provided along their entire length with either an electrically conductive sheath or an electrically conductive lead intimately associated therewith. See Mercer, U.S. Pat. No. 5,914,602, incorporated herein by reference. A common technique is to hook a transmitter to an access point on the utility being traced, such as a water meter, electrical switch box, etc., and to apply thereto an electrical signal of a known alternating current frequency. The utility responds by radiating a magnetic field of the same frequency along its entire length. An operator attempts to follow the path of the underground portion of the utility by detecting the magnetic field with a receiver tuned to the radiated signal. By tuning the magnetic field sensors of the receiver to the imposed frequency, the radiated frequency can be detected to the exclusion of other signals, and the underground portion of the utility can be faithfully traced.

It is also well known that certain utilities are more easily traced using specific frequencies. However, it often occurs that a frequency which was initially effective does not remain so while tracking the utility, due to such variations as its depth below ground level or magnetic radiances in the same bandwidth from other objects or impurities in the ground, which radiances hide or distort the signal. Often, a change in frequency will solve the problem and allow the operator to continue tracing the utility.

At times, the signal disappears or is severely diminished for no apparent reason. Tracing the utility must, of course, cease until the problem is identified and corrected. A great deal of non-productive time results from such problems. It is to the benefit of the operator to be able to quickly determine the cause of the problem and to be able to either solve it or at least to be aware that a prompt solution is not possible.

High among the most common causes of signal loss are battery failure and breaks in the magnetic transmission circuit. The former prevents the magnetic transmitter from supplying an output signal; the latter prevents the signal from being carried by the utility. At present, the operator must return to home base, i.e., the site of the transmitter, to check on the continuity of the circuit, the charge (or lack of charge) of the battery, or to check on the connections between the transmitter and the utility. Currently, it is also necessary for the operator to return to home base to change the frequency of the transmitter to cope with changing conditions. Since it is customary for the operator to walk hundreds of feet away from the transmitter while following the path of the utility, the time wasted travelling to and from the transmitter can be considerable.

Applicants' invention overcomes these problems by providing a radio link between the receiver and the transmitter which permits the operator to send commands from the receiver to the transmitter which controls selected transmitter functions and which provides the operator with critical information concerning conditions at the transmitter. The combination permits the operator to remain remote from the transmitter while detecting and/or correcting many common problems.

Many prior patents teach radio links between receiver and transmitter, but none, so far as applicants are aware, teach interrogating the transmitter for pertinent information and/or remotely controlling transmitter functions from the receiver. The following patents, incorporated herein by reference, are exemplary.

Yokoi, U.S. Pat. No. 5,194,812, interconnects transmitter and receiver with a radio link, but the RF signal is only a reference frequency to reduce the effects of noise, not a communication link for interrogating and/or controlling the transmitter. Yokoi teaches selecting a detector frequency appropriate for the type of utility to be traced, but does not teach changing that frequency once it has been selected due to events arising during field operations. Yokoi especially does not teach changing the tranmission frequency from the receiver.

Rider, U.S. Pat. No. 5,264,795, establishes communications between an operator at the transmitter and an operator at the receiver by means of a modulated signal induced in the pipe. The use of the induction signal as the communications carrier is inherently less efficient and less reliable than the use of a radio link. Further, Rider teaches communications between people, one at the transmitter and one at the receiver, not between receiver and transmitter per se. Rider continuously sends battery level information from transmitter to receiver without operator intervention, but he does not teach sending battery level information only upon request from a remote operator.

Archambeault et al., U.S. Pat. No. 5,469,155, and Mercer, U.S. Pat. No. 5,698,981, relay drill head signals picked up by a receiver to the operator at the drill control panel. Archambeault et al. use the information to control the drill; Mercer uses the information to record the drill path. Mercer, U.S. Pat. No. 5,914,602, supra, radios signals from pipes or drill heads directly to the drill operator. All require an operator at the transmitter, and none teach controlling tranmitter functions by an operator remotely located with the receiver.

SUMMARY OF THE INVENTION

A radio link is established between the portable receiver used by an operator to trace the underground portion of a utility and the transmitter which induces a magnetic signal in the utility. Circuitry in both transmitter and receiver allows the operator to interrogate the transmitter for essential information, such as whether or not the transmitter is generating a signal, the frequency being used in the transmission, the level of the transmitter's battery, or whether or not a complete transmission circuit is existent. Circuitry is also provided for controlling functions at the transmitter from the receiver carried by an operator remote from the transmitter, such as changing the transmission frequency of the generator, or conserving battery power by switching the transmitter's frequency generator off during periods of non-use.

OBJECTS OF THE INVENTION

It is an object of the invention to provide a utility tracing system which permits operation thereof by only one operator.

It is a further object of the invention to provide a utility tracing system which saves valuable field time by eliminating the need for the operator to repeatedly return to the location of the transmitter to find and/or fix problems.

It is a further object of the invention to provide a utility tracing system which includes a radio link between a receiver and a transmitter capable of allowing an operator to interrogate conditions at the transmitter from the receiver and to control functions of the transmitter from the receiver, while the operator is remote from the transmitter.

BRIEF DESCRIPTION OF THE DRAWINGS

The foregoing and other objects, aspects, uses, and advantages of the present invention will be more fully appreciated as the same becomes better understood from the following detailed description of the presently preferred best mode of the invention when viewed in conjunction with the accompanying drawings, in which:

FIG. 9 is a flow chart showing one type of operation of the locator transmitter microprocessor.

DETAILED DESCRIPTION OF THE PREFERRED EMBODIMENT

Figure 1:
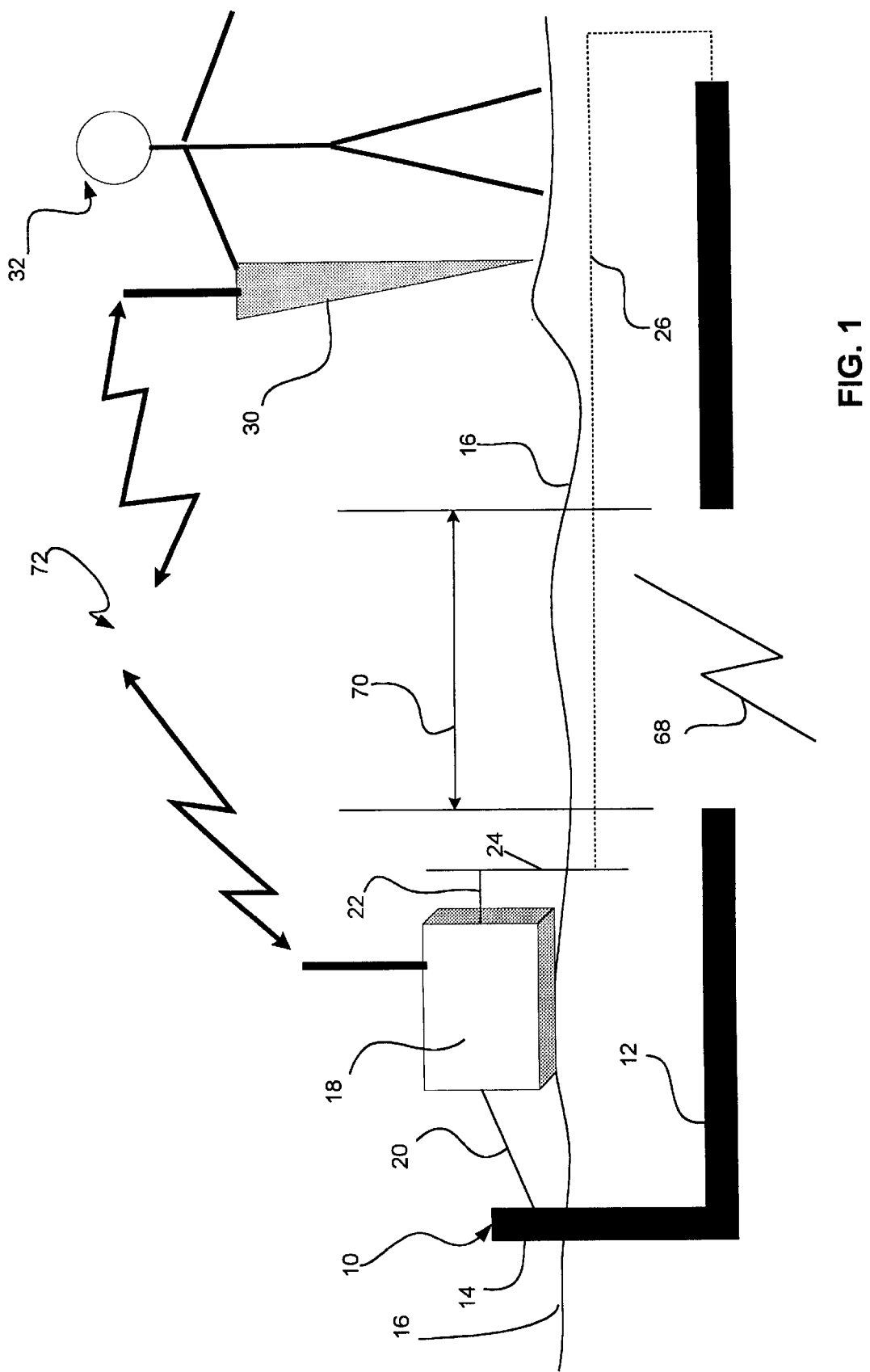
FIG. 1 is a diagrammatic representation which illustrates a preferred embodiment of the present invention depicting its use in the field.

Referring to FIG. 1, the inventive apparatus and the method of using same are diagrammatically disclosed as used in practice. The general activity of the invention is the locating and tracing of an electrically conductive underground utility. The specific activity of the invention is to establish a radio link capable of interrogating and/or controlling the transmitter from the receiver in order to facilitate the locating and tracing functions by a single operator.

An underground utility 10 is shown for illustrative purposes as a water pipe, although electrical cables, e.g., power cables or CATV cables, and other non-electrical lines, e.g., a plastic gas line or an optical cable, which have associated therewith a conductive strip or sheath, are also traceable subjects. Pipe 10 has an underground portion 12 and an aboveground portion 14 which surfaces above ground level 16 where it is connected to a utility source or to a user facility such as a water meter (not shown).

Figure 3:
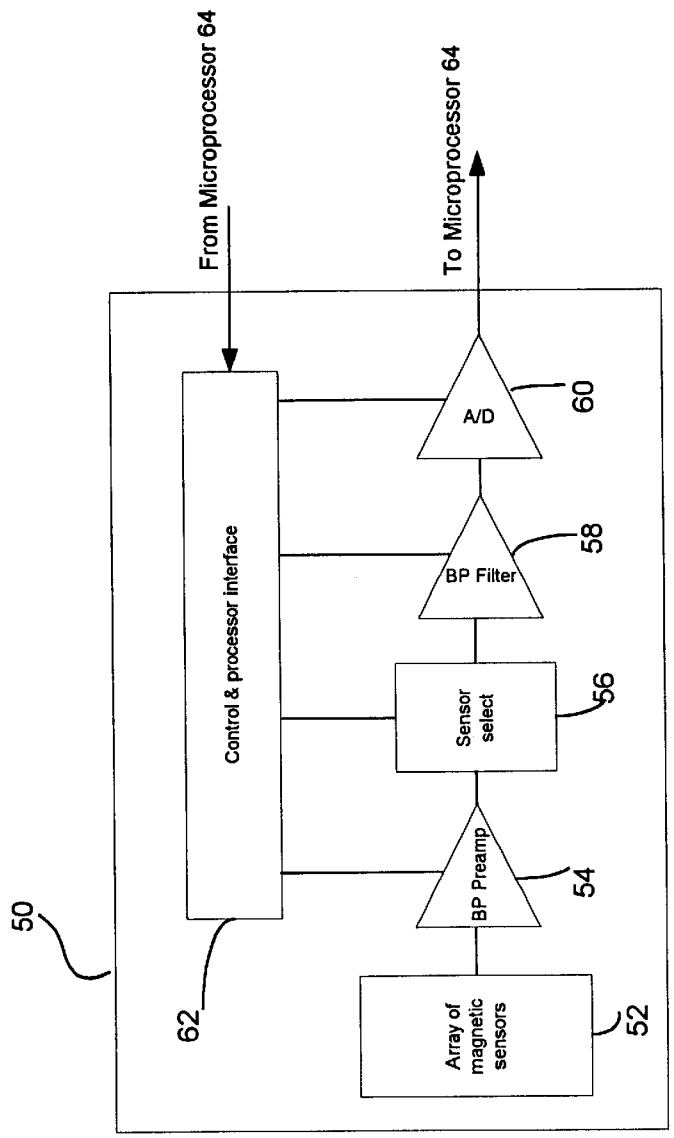
FIG. 3 is a block diagram of the magnetic receiver detecting a magnetic field.
Figure 3:
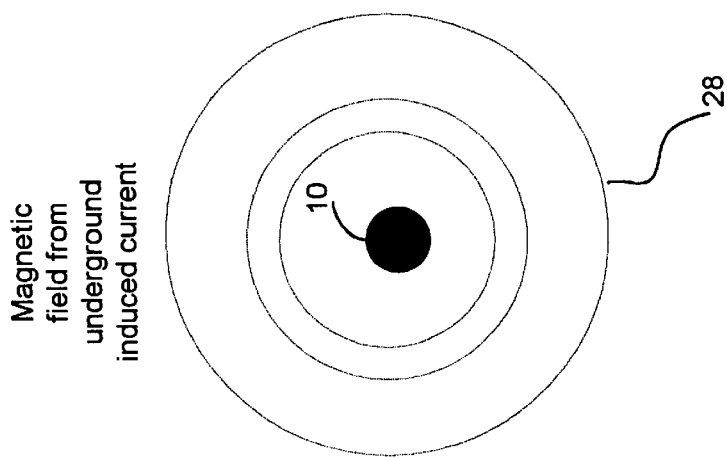

A locator transmitter 18 is connected by a "positive" electrical cable 20 to aboveground portion 14 of pipe 10 and connected by a "negative" ground cable 22 to a metal stake 24 driven into the ground. The natural conductivity of the earth closes an electrically conductive ground return path 26 between pipe 10 and stake 24, a prerequisite for the transmission of signals along pipe 10. Locator transmitter 18 induces an AC electrical signal of a preselected frequency into pipe 10. Because it is conductive, pipe 10 responds to the imposition of an alternating current electrical signal by generating a distinctive magnetic field of the same frequency around pipe 10 all along its conductive length. In FIG. 3, where pipe 10 is depicted as extending outwardly from the plane of the drawing, magnetic field 28 is shown schematically as magnetic field lines encircling pipe 10. Returning to FIG. 1, a portable locator receiver 30 is carried by an operator 32 along surface 16 above pipe 10. Locator receiver 30 is tuned to the frequency of magnetic field 28 and, based on the detected strength of field 28, gives an indication of the location of pipe 10, thus allowing operator 32 to follow the path of its underground portion 12.

Figure 2:
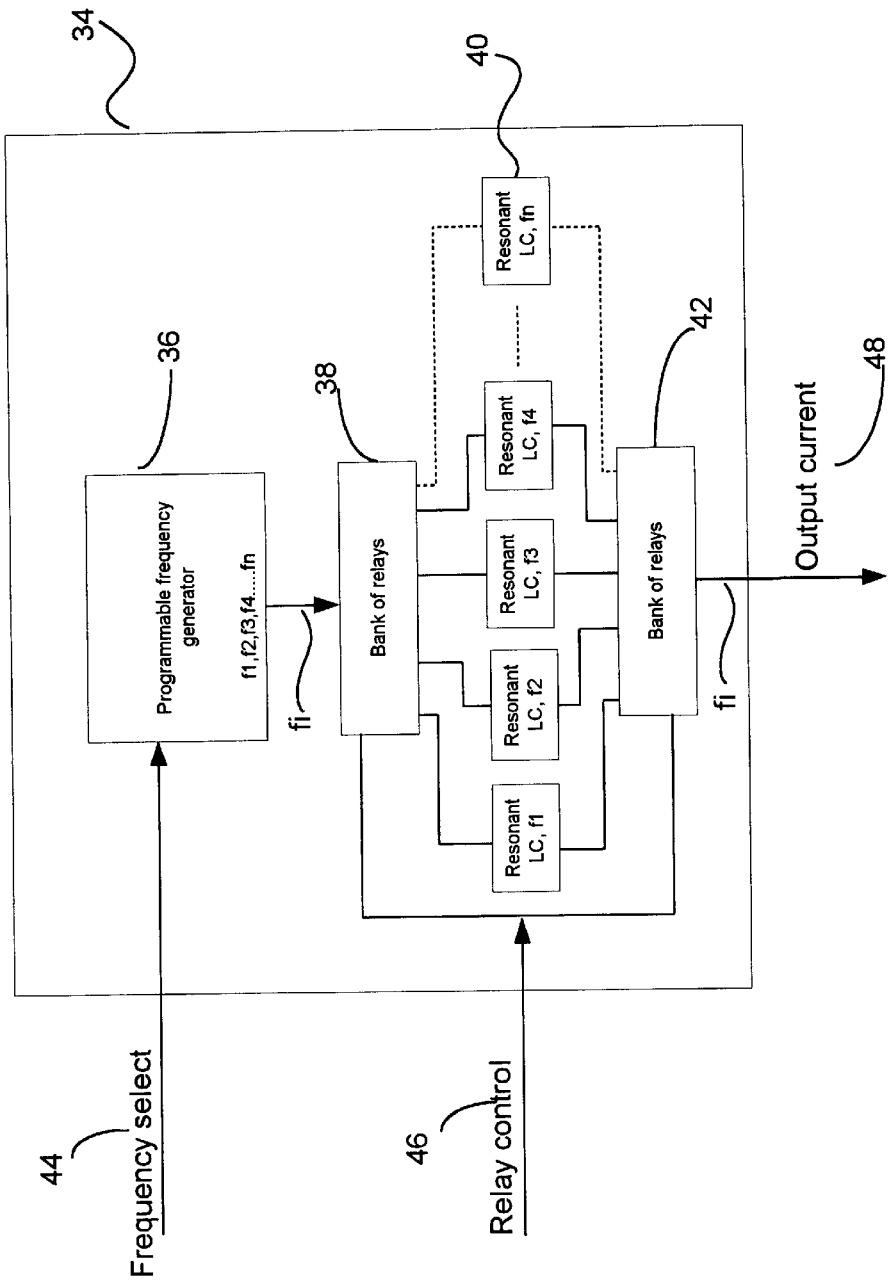
FIG. 2 is a block diagram of the magnetic transmitter.

So far, the operations are standard in the art, and applicants' invention can be adapted to many known means of applying an alternating electric current to pipe 10 and for detecting the magnetic field generated thereby, such as is shown in Rider, U.S. Pat. No. 5,264,795, supra. The preferred mode, however, is that disclosed herein, namely, direct contact between the locator transmitter 18 and the utility 10 in combination with the magnetic transmitter and magnetic receiver shown in FIGS. 2 and 3.

Locator transmitter 18 includes a magnetic transmitter 34 (FIG. 2) comprising a programmable frequency generator 36, a first bank of relays 38, a plurality of resonant LC circuits 40, and a second bank of relays 42. In operation, magnetic transmitter 34 receives a frequency select signal 44 which directs frequency generator 36 to select a 20 particular frequency fi from a plurality of available frequencies f1, f2, f3, f4 ... fn. The selected frequency fi is supplied to said first bank of relays 38. Along with said frequency select signal 44, magnetic transmitter 34 receives a relay control signal 46 which simultaneously connects both of said first and second banks of relays 38 and 42 to the input and output, respectively, of the particular resonant LC circuit 40 which is tuned to said selected frequency fi. Resonant LC circuit 40 tunes the circuit and provides the high current drive needed from magnetic transmitter 34 in order for output current 48 to be sufficient to induce a strong magnetic signal around pipe 10.

Locator receiver 30 includes a magnetic receiver 50 (FIG. 3) comprising an array of magnetic sensors 52, a band pass preamplifier 54, a sensor select 56, a band pass filter 58, an analog-to-digital converter 60, and a control and processor interface 62.

Magnetic sensors 52 detect the horizontal component and/or the vertical component of magnetic field 28, depending on the operating mode selected by operator 32. Array 52 thus provides a plurality of signals (one from each sensor) which, when mathematically combined, has values indicative of the location (direction and/or distance) of pipe 10 from locator receiver 30. It is within the scope of the invention for the array of magnetic sensors 52 to include as many sensors as is necessary for the job being contemplated. See the U.S. Pat. No. 4,091,322, to Stankoff, Tavernetti et al., U.S. Pat. No. 5,043,666, and Balkman, U.S. Pat. No. 5,093,622, all incorporated herein by reference, for a non-exhaustive collection of samples of magnetic sensor arrays which would be suitable for use in the invention.

The plurality of signals from array 52 are fed to band pass preamplifier 54 which eliminates unwanted noise, amplifies the signals derived from magnetic sensors 52, and passes them on to sensor select 56. Sensor select 56 is a multiplexer controlled by the microprocessor 64 in locator receiver 30 (FIG. 4) which selects one of the magnetic sensor signals for input into band pass filter 58. BP filter 58 further removes unwanted noise and amplifies the desired signal to a level adequate to drive the input of A/D converter 60. From this point on, the signals must be in digital form so that they are suitable for subsequent manipulation by microprocessor 64.

Consequently, all signals from band pass filter 58 are converted to digital signals by analog-to-digital converter 60 prior to being received by microprocessor 64. Control and processor interface 62, under the control of microprocessor 64, sets the gain of preamplifier 54, instructs sensor select 56 as to which sensor's signals to select, sets the gain and adjusts the bandwidth of band pass filter 58, and sets up the timing and handshaking signals for the A/D converter 60.

Figure 4:
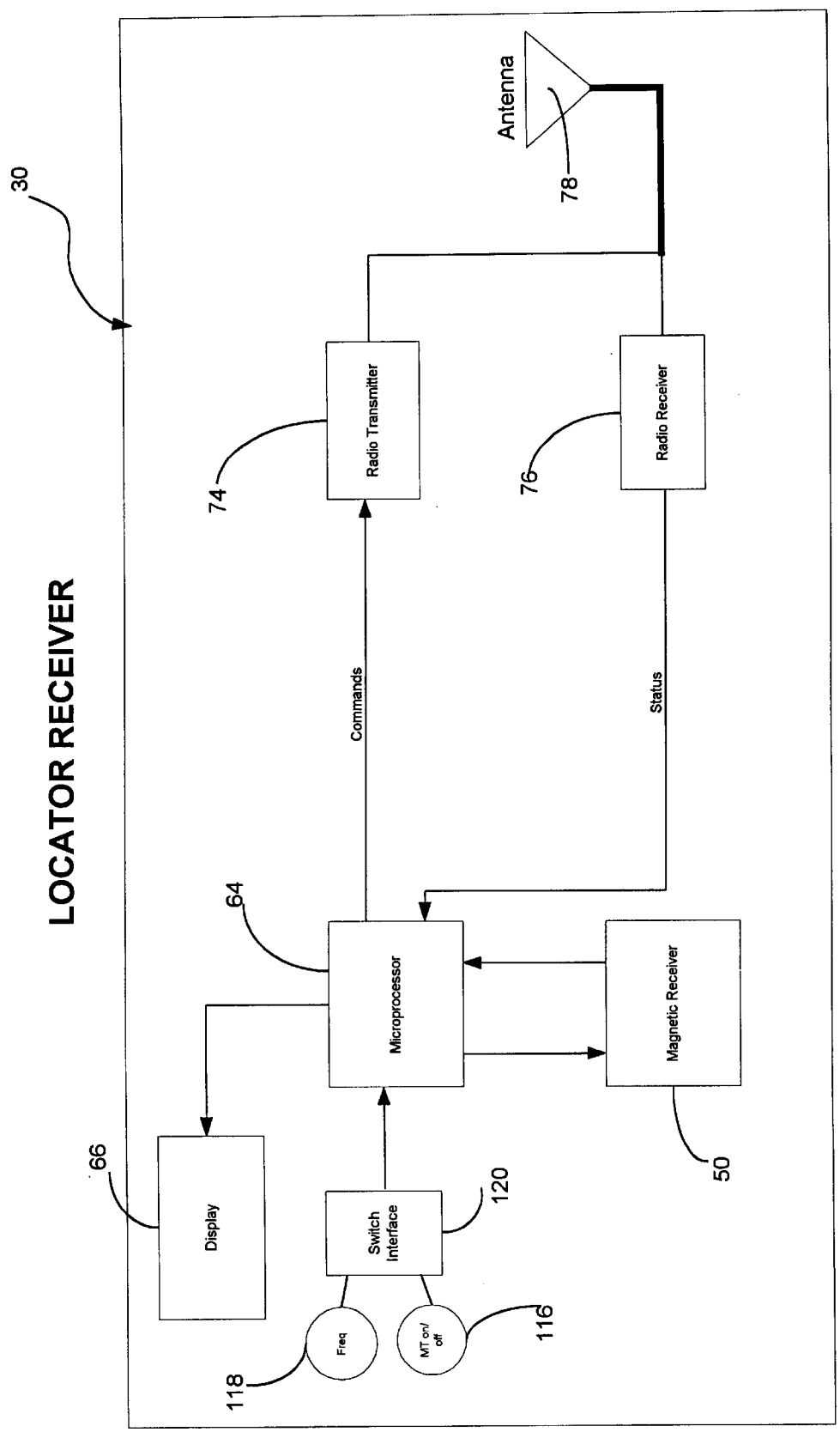
FIG. 4 is a block diagram of the locator receiver.
Figure 8:
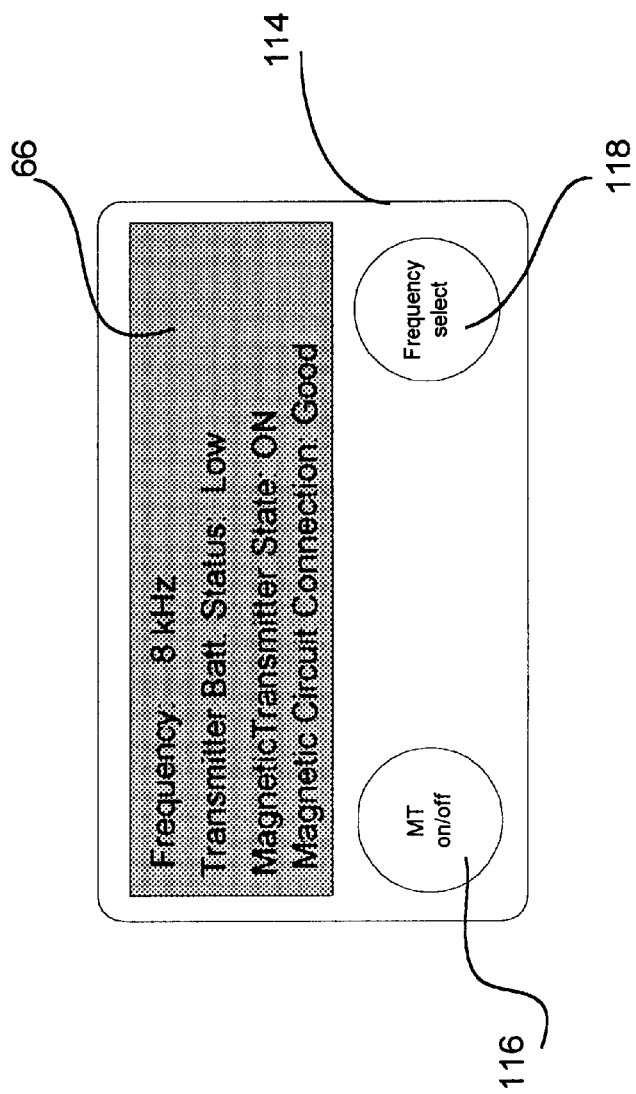
FIG. 8 is a top pictorial view of a portion of the control panel of the locator receiver.

Referring to FIG. 4, pertinent components of locator receiver 30 are shown in block form. The output signals from magnetic receiver 50 are processed by microprocessor 64 and the results (direction, distance, etc., of pipe 10) are displayed as a location indication (not shown) on a suitable display 66 (FIGS. 4 and 8).

In conventional operations, operator 32 (FIG. 1) attaches cables 20 and 22 to the aboveground portion 14 of pipe 10 and stake 24, respectively, turns on both locator transmitter 18 and locator receiver 30, selects a frequency appropriate to the utility in question, and marches off with locator receiver 30 to trace the underground portion 12 of pipe 10. Should the receiver cease to display the pipe's location, operator 32 is faced with a quandary: Is the cause of the cessation of the location indication due to equipment failure or is the cause due to a change in conditions independent of the operating system? Has pipe 10 ceased radiating magnetic signals? If so, why are there no signals? Are electrical signals still being induced in pipe 10? If not, why? Is locator transmitter 18 still on? Has its battery failed? Has locator transmitter 18 been destroyed or stolen? Has the electrical connection between locator transmitter 18 and pipe 10 been broken, e.g., has cable 20 and/or cable 22 come loose? If the equipment is operating properly, and operator 32 has no right to assume it is, is the problem due to causes other than equipment failure? Is pipe 10 passing through a region which is introducing magnetic fields from sources other than magnetic transmitter 34 such that the noise created thereby could be interfering with magnetic field 28, in effect, masking it? (If so, changing programmable frequency generator 36 to a different frequency will often result in a detectable signal.) Has the underground portion 12 of pipe 10 taken a sudden dip or turn? (Increasing the gain of preamplifier 54 and of band pass filter 58 of magnetic detector 50, changing the frequency fi of magnetic tranmitter 34, and moving around in the general area is usually effective in restoring contact with pipe 10.) Has pipe 10 suffered a break, perhaps separating into two closely adjacent portions, resembling a compound fracture? (If so, raising the frequency of the transmitted signal and expanding the search area are often successful.) Or, has the pipe ended? (It is not usually a surprise to operator 32 for a pipe to end suddenly; often his task is to locate the terminus of the pipe. If so, his work is completed. But, before stopping the tracing activity, he must be sure the disappearance of the location indication is not due to some other cause. This requires eliminating all other probable sources of the problem.)

As is apparent, some of the steps operator 32 must take to investigate the mystery involves returning to home base to check locator transmitter 18, and some of the steps can be performed in situ. Operator 32 is loath to commit to either alternative, for either choice, if wrong, could waste a considerable amount of time. It is not uncommon for operator 32 to roam as far from locator transmitter 18 as 1000 feet (the distance being represented diagrammatically by the "break" 68 and double-ended arrow 70 in FIG. 1), and one skilled in the art knows all too well that trekking back and forth to the transmitter to check out the possibilities, the present practice, consumes a great deal of time. Also, depending upon how rough the terrain is, it could be difficult or hazardous to make the round trip to and from the transmitter. Yet it is fruitless to search for a "missing" pipe, when the problem is, in reality, equipment failure. And, it can be very frustrating not knowing which it is.

Some of the current implementations of this type of equipment have partially addressed this problem by transmitting all frequencies simultaneously and allowing operator 32 to tune locator receiver 30 to the frequency desired. While this solution will prevent a trip back to locator transmitter 18 for some of the scenarios explained above, it has the drawback of taxing the battery more than necessary, severely reducing battery life, and making the detection of a given frequency by locator receiver 30 more difficult.

According to the invention disclosed herein, the dilemma is resolved by establishing a two-way radio link 72 (FIG. 1) between locator transmitter 18 and locator receiver 30, and circuitry is provided in both to permit operator 32 to interrogate locator transmitter 18 and to control certain functions produced thereby from locator receiver 30.

Figure 5:
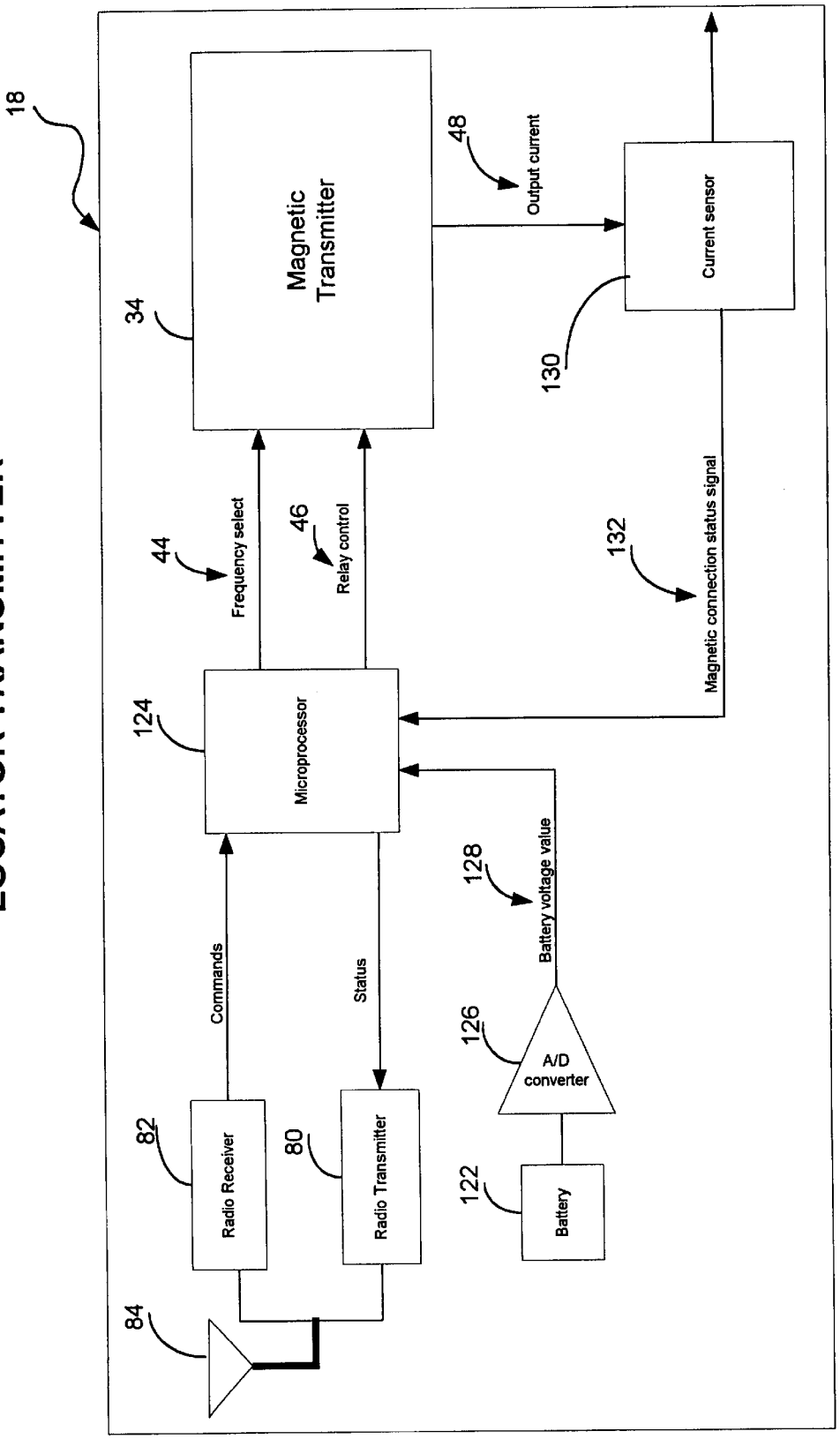
FIG. 5 is a block diagram of the locator transmitter.

Referring to FIGS. 4 and 5, locator receiver 30 further includes a radio transmitter 74 and a radio receiver 76, both of which are operatively connected to an antenna 78. In like manner, locator transmitter 18 includes a radio transmitter 80 and a radio receiver 82 which are operatively connected to an antenna 84. Since radio transmitters 74 and 80 are identical, and since radio receivers 76 and 82 are also identical, only one of each needs to be described. It is to be understood that any suitable transmitter and/or receiver can be utilized within the scope of the invention, but the presently preferred best mode is as shown in FIGS. 6 and 7.

Figure 6:
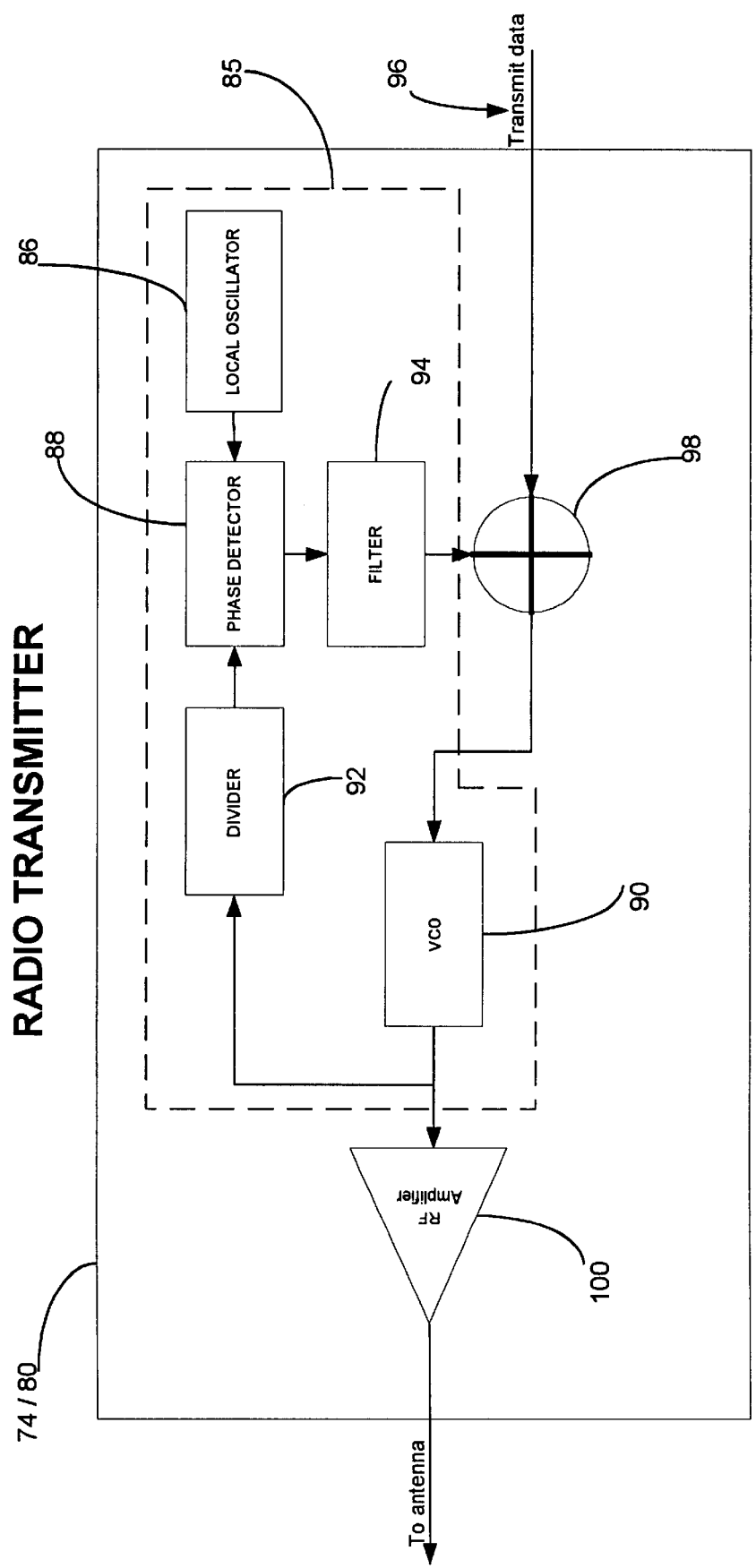
FIG. 6 is a block diagram of the radio transmitters.
Figure 7:
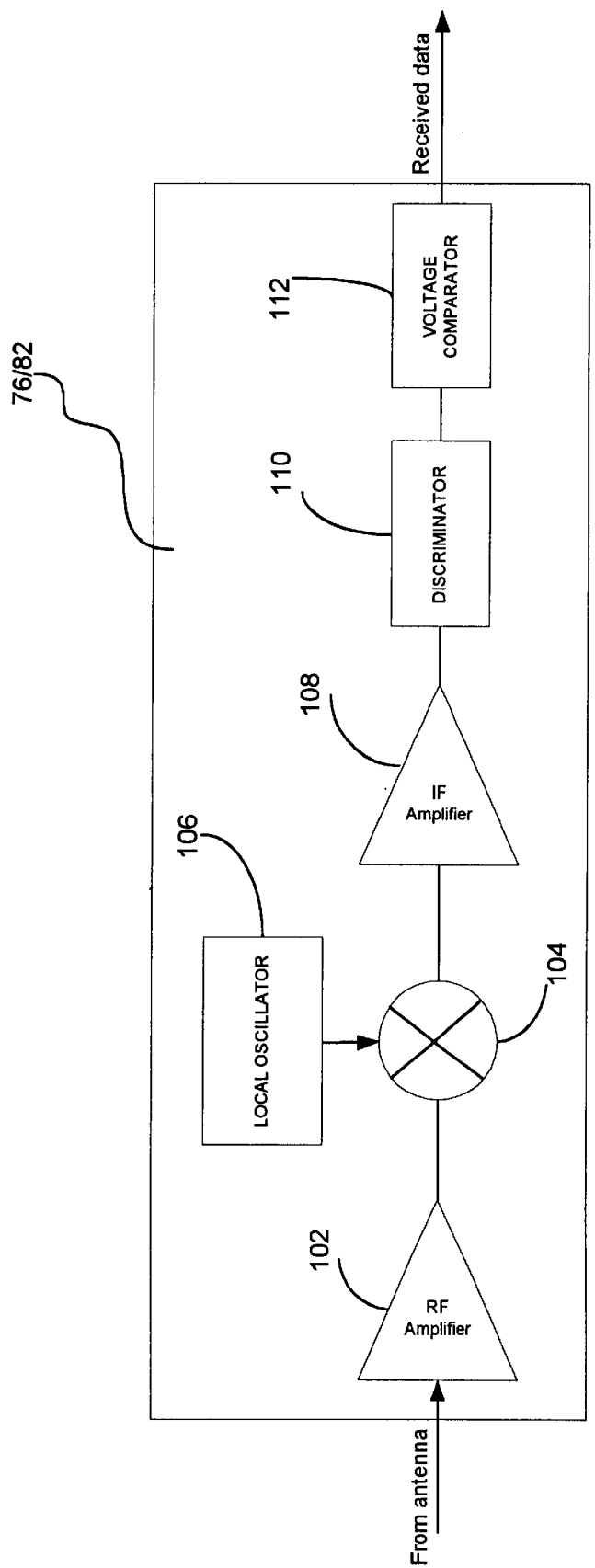
FIG. 7 is a block diagram of the radio receivers.

Referring to FIG. 6, radio transmitters 74 and 80 are described.

The carrier frequency of the transmitter employed is derived by a synthesizer 85 comprising a local oscillator 86, a phase detector 88, a Voltage Controlled Oscillator 90, a divider 92, and a filter 94. Other strategies could be employed but synthesizer 85 offers the advantages of accuracy, small physical size, and no adjustable components. Local oscillator 86 is a crystal oscillator which produces a stable reference frequency. Phase detector 88 compares this frequency with the output of the Voltage Controlled Oscillator 90 after its frequency is divided by a fixed modulus by divider 92. The output of phase detector 88 is filtered by filter 94 and is applied to the input of VCO 90 to complete a phase lock loop. The VCO output frequency, which is also the transmit carrier frequency, will be equal to the reference frequency multiplied by the divide modulus.

Data 96 to be transmitted is summed in adder 98 with the output of filter 94 and the sum is injected into VCO 90. Injection of the summed data will momentarily drive the VCO output frequency to another value, effecting frequency modulation of the carrier. In time, the phase lock loop will correct the VCO output frequency back to its original value.

The particular RF transmission modulation scheme employed is commonly referred to as Frequency Shift Keying (FSK). This consists of shifting the frequency of the carrier between two values as dictated by the binary input data stream, i.e., transmit data 96. A zero shifts the carrier frequency in one direction; a one shifts the carrier frequency in the opposite direction. As will be appreciated by one skilled in the art, effective communication requires that the transmit data rate be at least an order of magnitude greater than the phase lock loop bandwidth and the transmit data 96 must be encoded so that its average value is zero. The modulated frequency signals are amplified by radio frequency amplifier 100 for transmission from its associated antenna 78 or 84.

The transmitted data 96 is received by the other antenna 84 or 78 (FIG. 7) where it is immediately amplified by RF amplifier 102. The amplified signal is combined by mixer 104 with the fixed frequency from local oscillator 106 to extract the modulated data from the carrier frequency. After being amplified by an intermediate frequency amplifier 108, the extracted data signal is filtered by discriminator 110 and digitized by voltage comparator 112. The digital signal is then forwarded to the associated microprocessor.

Returning to FIGS. 4, 5, and 8, the operation of the invention will now be described. Housing 114 (FIG. 8) of locator receiver 30 includes a pair of control buttons, an MT (Magnetic Transmitter) on/off button 116 and a frequency select button 118, both of which access microprocessor 64 through a switch interface 120 (FIG. 4). Control buttons 116 and 118 comprise a pair of operator manipulated controls, each of which initiates a control signal for controlling a specified operating function of locator transmitter 18. Alternate depressions of MT on/off button 116 turn magnetic transmitter 34 on and off. Repeated depressions of frequency select button 118 scroll through the set of permissible frequencies f1, f2, f3, f4 . . . fn that programmable frequency generator 36 is designed to generate. Selection of frequency fi is made by stopping the scrolling operation. Buttons 116 and 118 are mounted in facing relationship with operator 32 adjacent display 66. Display 66 is an LCD panel which is capable of displaying text or graphics to operator 32. As shown in FIG. 8, display 66 provides operator 32 with at least the following information: (1) the frequency fi (8 kHz), presently being imposed upon pipe 10; (2) the status (Low) of battery 122; (3) the on/off state (ON) of magnetic transmitter 34; and (4) the status (Good) of the magnetic circuit comprising cable 20, pipe 10, ground return path 26, stake 24, and cable 22.

The use of the invention will now be described.

Initially, after attaching cables 20 and 22 to section 14 of pipe 10 and to stake 24, respectively, operator 32 starts the tracing activity by turning on locator transmitter 18 and locator receiver 30 by switches which are not shown. MT on/off 116 is depressed to turn on magnetic transmitter 34, and a frequency fi for generation by programmable frequency generator 36 is selected by operation of frequency select button 118. Microprocessor 64 senses the inputs from buttons 116 and 118 and sends the appropriate related commands to radio transmitter 74 which in turn broadcasts them from antenna 78. Antenna 84 and radio receiver 82 of locator transmitter 18 receive the commands and supplies them to microprocessor 124 of locator transmitter 18. In accordance with its programming, microprocessor 124 turns on magnetic transmitter 34 and, by means of the appropriate frequency select signal 44, commands the programmable frequency generator 36 of magnetic transmitter 34 (FIG. 2) to generate the requested frequency. Concurrently, microprocessor 124 sends a relay control signal 46 to the first and second banks of relays 38 and 42 to select the LC resonant circuit 40 consonant with the selected frequency. The on/off status of magnetic transmitter 34 plus a readout of the selected frequency are sent back to locator receiver 30 by radio transmitter 80 and antenna 84 under the direction of microprocessor 124. Operator 32 is now ready to commence tracing pipe 10.

Anytime operator 32 desires, e.g., when walking to or from the working site or when taking a break from tracking pipe 10, magnetic transmitter 34 may be turned off by depression of MT on/off button 116. This allows operator 32 to conserve the power remaining in battery 122 (FIG. 5) in locator transmitter 18 during periods of non-use. One of the major annoyances while tracing an underground utility is to have it interrupted or terminated by battery failure. Inasmuch as driving the output of magnetic transmitter 34 is the largest single drain on battery 122, the disclosed invention greatly extends the life of battery 122 by being capable of selectively turning off magnetic transmitter 34 from locator receiver 30.

As pointed out above, there are times when the signal disappears. It could be due to any one or more of several causes, one of which is transmitter failure. Should locator transmitter 18 be stolen and taken out of the range of radio link 72, or fatally damaged, operator 32 would be apprised of this, since its status would no longer appear on display 66, even with operator 32 repeatedly toggling button 116 through on and off.

Another cause of loss of signal, or a severely distorted or weakened one, is spurious magnetic emanations from other buried objects or natural formations. VLF signals, are constantly being broadcast, such as, for example, on the East Coast of the United States by the U.S. Navy at frequencies of 17.8 KHz and 21.4 KHz. Buried metallic objects or metallic ores respond by radiating magnetic fields. Others in the art have made use of these signals to trace underground utilities. The frequencies of these unwanted magnetic fields often interfere with the frequency fi imposed on pipe 10 by magnetic transmitter 34. When this occurs, the usual practice is for the operator to return to locator transmitter 18, change the transmitted frequency, and retrace pipe 10 as many times as is necessary to find a frequency which is outside the bandwidth of the unwanted, interfering frequencies. Alternatively, with systems that transmit all frequencies simultaneously, the operator can tune the locator receiver 30 to detect only the desired frequency, but as pointed out before, these systems tax the battery and make if more difficult to accurately detect the desired frequency. With the inventive system, operator 32 can correct the problem by simply scrolling through frequencies f1, f2, f3, f4 . . . fn until a readable signal is again detected by magnetic receiver 50, accomplishing the feat without having once to return to home base to change frequencies on locator transmitter 18. Microprocessor 64 processes the new entry and actuates radio transmitter 74 to send the instructions to locator transmitter 18. Locator transmitter 18 responds by changing fi in the manner described above and notifies locator receiver 30 of the new frequency which is displayed on LCD screen 66.

The remaining status indications on display screen 66, namely, the battery status and the status of the circuit connection, are constantly being monitored by circuitry within locator transmitter 18.

Analog-to-digital converter 126 (FIG. 5) monitors the voltage level of battery 122 and supplies the battery voltage value 128 to microprocessor 124. Should the detected signal disappear, operator 32 can immediately determine whether a low battery is the cause by simply consulting the battery voltage value 128. If sufficient voltage is present, then the problem must lie elsewhere. If battery 122 is dead, operator 32 at least knows that he must return to home base to replace it or else to cease tracking operations. Either way, valuable time is saved.

Current sensor 130 (FIG. 5) monitors output current 48 and forwards a magnetic connection status signal 132 to microprocessor 124. Again, should the detected signal disappear, operator 32 can determine whether or not an open circuit is the cause. If display 66 shows magnetic transmitter 34 to be ON, yet no current is being imposed upon pipe 10, as indicated by magnetic connection status signal 132, one or both of cables 20 and 22 may have become dislodged, e.g., due to accident, wind, etc. A return to home base is suggested.

Thus, by means of the invention, all of the common causes of signal failure can be investigated and corrected, if at all possible, in situ from locator receiver 30.

Several modes of operation are within the purview of the invention, namely, the status indications displayed on LCD screen 66, e.g., the frequency fi presently being imposed upon pipe 10, the status of battery 122, the on/off state of magnetic transmitter 34, and the status of the magnetic circuit connection 132 can (1) be continuously supplied to operator 32, (2) be periodically sent to display 66 by a timer program within microprocessor 124, (3) be transmitted only by request from operator 32 from locator receiver 30, or (4) be transmitted only when requested by a timer program within microprocessor 64 from locator receiver 30. The presently preferred mode is to display the information only when requested by a timer program within microprocessor 64. This approach allows microprocessor 64 to request the information only when it is able and ready to process it, and eliminates an additional control which would be needed if operator 32 were required to manually initiate the request from locator receiver 30. The reduction of the number of controls needed on locator transmitter 18 is an important feature of the invention, for it reduces the complexity inherent in operating many current models.

It is fully apparent by now that all transmitter operations can be directed by commands sent via radio link 72 from locator receiver 30. A fringe benefit attributable to this feat is that all external controls can be eliminated from locator transmitter 18, permitting a redesign of locator transmitter 18, which renders it simpler, more compact, and less expensive to manufacture than the industry norm, an unexpected result afforded by the invention. A power-on switch is preferably located on locator transmitter 18, but by appropriate circuitry, it too can be eliminated, if desired.

FIG. 9 illustrates by means of a program flowchart 134 the operations of an exemplary program currently being used in microprocessor 124. While it is the best mode presently preferred, variations are also within the scope of the appended claims. Other programs are operative within microprocessor 124. Program 134 is explicitly detailed, since it is unique to this invention.

When locator transmitter 18 is initially turned on, microprocessor 124 is initialized, and program 134 starts running, indicated in flowchart 134 by Start 136. Program 134 then waits for a valid command from radio receiver 82, indicated conceptually in flowchart 134 by the first interrogatory 138, "Has a new command been received?" If the answer is "no", microprocessor 124 returns program control to the input of first interrogatory 138 which enters into a "waiting" mode, continuously asking the same question until such time as a command arrives, allowing program control to take the "yes" path out of this decision block to the second interrogatory 140. The identification of which of the five valid commands has been received is effected by the next five interrogatories.

Second interrogatory 140 asks, "Is the command to change the frequency?" If the answer is "yes", microprocessor 124 sets programmable frequency generator 36 of magnetic transmitter 34 to the desired frequency fi at step 142, sets the relay control signal 46 to select the desired relay set at step 144, and a message indicating the new frequency is composed and transmitted to display 66 at step 148. Then microprocessor 124 returns program control to the input of first interrogatory 138 to await a new command. If the answer to the query of interrogatory 140 is "no", program control steps to the third interrogatory 150.

Third interrogatory 150 asks, "Is the command to send the battery status?" If "yes", A/D converter 126 reads the battery voltage at step 152, and a message indicating the status of battery 122 is composed and transmitted to display 66 at step 154, whereupon program control returns to the input of first interrogatory 138 to await a new command.

If the answer is "no", program control steps to the fourth interrogatory 156 which asks, "Is the command to send the status of the magnetic circuit connection?" If the answer is "yes", then output current 48 is read by current sensor 130 and compared at step 158 to pre-stored ranges that determine if a good or bad connection is present, and a message indicating the status of the magnetic circuit connection is composed and transmitted to display 66 at step 160, whereupon program control again returns to the input of first interrogatory 138 to await a new command. If the answer is "no", i.e., the request does not involve the magnetic circuit connection status, program control steps to the fifth interrogatory.

The fifth interrogatory 162 asks, "Is the command to turn the magnetic transmitter power off?" If "yes", then microprocessor 124 turns the magnetic transmitter power off by setting frequency select signal 44 and relay control signal 46 to a special mode setting at step 164, and a message indicating the status of the magnetic transmitter power is composed and transmitted to display 66 at step 166. Program control is then returned to the input of first interrogatory 138 to await a new command. If the answer is "no", program control steps to the sixth interrogatory.

The sixth interrogatory 168 asks, "Is the command to turn the magnetic transmitter power on?" If "yes", then microprocessor 124 turns the magnetic transmitter power on by setting frequency select signal 44 and relay control signal 46 to a special mode setting which enables magnetic transmitter 34 at step 170, and a message indicating the status of the magnetic transmitter power is composed and transmitted to display 66 at step 172. Program control is then returned to the input of first interrogatory 138 to await a new command.

It will be remembered that a command has been received. Each interrogatory checks to see if the command is applicable to it, and if it is, takes appropriate action, but if it is not, program control proceeds to the next interrogatory, until the command has been identified as a valid one and obeyed, at which time program control returns to the first decision block to await another command. If the answer at interrogatory 168 is "no", then none of the functions monitored by the interrogatories were being commanded. In other words, the "command" was not a valid command but instead was a spurious signal which somehow found its way into program 134. The path followed by program control when all the interrogatories are "no" is a fail safe which passes the spurious signal harmlessly through the system and returns program control back to first interrogatory 138 to wait for a new command.

It is clear from the above that the objects of the invention have been fulfilled. Radio link 72 allows operator 32 to monitor and control locator transmitter 18 from locator receiver 30. By having access to vital information available only at locator transmitter 18, while remaining at the tracking site, physically separated therefrom, operator 32 will not have to guess at conditions at locator transmitter 18 when a signal disappears and can thereby avoid unnecessary trips back to the site of locator transmitter 18. Operator 32 can also change settings, including turning on and off magnetic transmitter 34 during non-tracking periods to conserve battery power, while remote from locator transmitter 18.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention as defined in the appended claims.

Further, the purpose of the foregoing Abstract is to enable the U.S. Patent and Trademark Office, and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of the application, which is measured solely by the claims, nor is intended to be limiting as to the scope of the invention in any way.

It can be seen from the above that an invention has been disclosed which fulfills all the objects of the invention. It is to be understood, however, that the disclosure is by way of illustration only and that the scope of the invention is to be limited solely by the following claims:

What is claimed is:

1. A locator system for locating and tracing an underground electrical conductor, comprising:
    a locator transmitter and a locator receiver;
    said locator transmitter inducing an alternating current in said conductor which responds by radiating a magnetic field therearound;
    said locator receiver detecting said magnetic field and displaying an indication of the location of said conductor; and
    said locator transmitter and said locator receiver including a radio link therebetween, said radio link including circuitry within both said locator transmitter and said locator receiver which permits said locator receiver to interrogate said locator transmitter concerning the operational status of specified operating functions of said locator transmitter, to receive information from said locator transmitter concerning said operational status, and to control at least one of said specified operating functions of said locator transmitter from said locator receiver.

2. The locator system of claim 1 wherein said radio link includes a radio receiver, a radio transmitter, and an antenna in each of said locator transmitter and said locator receiver, and a microprocessor in each of said locator transmitter and said locator receiver, each of said microprocessors functioning to send and receive data over said radio link.

3. The locator system of claim 2 wherein said locator receiver further comprises at least first and second operator manipulated controls, each of which initiates a control signal for controlling a specified operating function of said locator transmitter.

4. The locator system of claim 3 wherein said locator transmitter further comprises a magnetic transmitter which induces said alternating current in said conductor, and said first operator manipulated control functions to turn said magnetic transmitter on and off.

5. The locator system of claim 3 wherein said locator transmitter further comprises a magnetic transmitter which induces said alternating current in said conductor, said magnetic transmitter being capable of generating one of a plurality of frequencies for induction in said conductor, and said second operator manipulated control being operative to select one of said plurality of frequencies for generation.

6. The locator system of claim 5 wherein said second operator manipulated control sends a frequency select signal to said locator receiver microprocessor which transmits said frequency select signal via said radio link to said locator transmitter microprocessor which in response commands said magnetic transmitter to generate said selected one of said plurality of frequencies.

7. The locator system of claim 6 wherein said locator receiver includes a display which displays said selected frequency.

8. The locator system of claim 5 wherein said magnetic transmitter comprises a programmable frequency generator which selectively generates said one of a plurality of frequencies and said magnetic transmitter further comprises a plurality of LC resonant circuits, each of which is tuned to one of said plurality of frequencies and which provides a high current drive to said output current, wherein said second operator manipulated control sends a frequency select signal to said locator receiver microprocessor which transmits said frequency select signal via said radio link to said locator transmitter microprocessor which simultaneously selects said one of said plurality of frequencies for generation by said programmable frequency generator and said one of said plurality of LC resonant circuits consonant with said selected one of said plurality of frequencies for generation by said programmable frequency generator.

9. The locator system of claim 3 wherein said first and second operator manipulated controls are a pair of buttons.

10. The locator system of claim 2, wherein said locator transmitter further comprises a current sensor which monitors said alternating current generated by said magnetic transmitter and said locator receiver microprocessor further comprises a timer program which interrogates said current sensor via said radio link as to the status of said alternating current, and said locator transmitter responds by transmitting said status of said alternating current via said radio link to said locator receiver microprocessor which displays said status of said alternating current.

11. The locator system of claim 2 wherein said locator transmitter further comprises a battery and a battery voltage sensor, and said locator receiver microprocessor further comprises a timer program which interrogates said battery voltage sensor via said radio link as to the status of said battery voltage, and said locator transmitter responds by transmitting said status of said battery voltage via said radio link to said locator receiver microprocessor which displays said status of said battery voltage.

12. The locator system of claim 2 wherein said electrical conductor is an underground utility.

13. The locator system of claim 12 wherein said utility is a metal water pipe.

14. The locator system of claim 12 wherein said utility is an electrical cable.

15. The locator system of claim 2 wherein said electrical conductor is an electrical lead intimately associated with a non-conductive underground utility.

16. The locator system of claim 2 wherein said electrical conductor is a metallic sheath surrounding a non-conductive underground utility.

17. The locator system of claim 2 wherein said indication of the location of said conductor includes the relative distance and direction of said conductor from said locator receiver.

18. The locator system of claim 2 wherein said locator receiver comprises a magnetic receiver which detects said magnetic field and which produces signals proportional thereto, said locator receiver microprocessor processes said signals proportional to said magnetic field and produces a display signal having values representative of said relative distance and direction of said conductor from said locator receiver, and a display which responds to said display signal by displaying said indication of said relative distance and direction of said conductor from said locator receiver.

19. A locator system for locating and tracing an underground electrical conductor, comprising:

a locator transmitter and a locator receiver;

said locator transmitter inducing an alternating current in said conductor which responds by radiating a magnetic field therearound;

said locator receiver detecting said magnetic field and displaying an indication of the location of said conductor; and said locator transmitter and said locator receiver including a radio link therebetween, wherein said radio link includes circuitry which permits (1) the control of specified operating functions of said locator transmitter from said locator receiver and (2) the interrogation of said locator transmitter from said locator receiver in order to determine specified operating conditions of said locator transmitter;

said radio link comprises a radio receiver, a radio transmitter, and an antenna in each of said locator transmitter and said locator receiver;

each of said locator transmitter and said locator receiver further including a microprocessor which functions to send and receive data over said radio link;

said locator receiver further comprises at least first and second operator manipulated controls, each of which initiates a control signal for controlling a specified operating function of said locator transmitter.

said locator transmitter further comprises a magnetic transmitter which induces said alternating current in said conductor, said magnetic transmitter being capable of generating one of a plurality of frequencies for induction in said conductor, said first operator manipulated control functioning to turn said magnetic transmitter on and off, and said second operator manipulated control being operative to select one of said plurality of frequencies for generation;

said locator transmitter further comprises a current sensor which monitors said alternating current generated by said magnetic transmitter, and said locator receiver microprocessor further comprises a timer program which interrogates said current sensor via said radio link as to the status of said alternating current, said locator transmitter responds by transmitting said status of said alternating current via said radio link to said locator receiver microprocessor;

said locator transmitter further comprises a battery and a battery voltage sensor, and said locator receiver microprocessor further comprises a second timer program which interrogates said battery voltage sensor via said radio link as to the status of said battery voltage, said locator transmitter responds by transmitting said status of said battery voltage via said radio link to said locator receiver microprocessor; and said locator receiver includes a display which displays said selected frequency, said status of said battery voltage, said status of said alternating current, and said on/off state of said magnetic transmitter.

\* \* \* \* \*